United States Patent [19]

Wiechard

[11] Patent Number: 4,620,958

[45] Date of Patent: Nov. 4, 1986

[54] METHODS OF AND APPARATUS FOR MOLDING ARTICLES THROUGH A BALANCED, REMOVABLE RUNNER SYSTEM

[75] Inventor: Charles A. Wiechard, Tucker, Ga.

[73] Assignee: AT&T Technologies, Inc., Berkeley Heights, N.J.

[21] Appl. No.: 655,655

[22] Filed: Sep. 28, 1984

[51] Int. Cl.⁴ .................. B29C 45/03; B29C 45/27
[52] U.S. Cl. ..................... 264/297.2; 264/297.8; 264/328.8; 264/328.9; 264/328.11; 264/328.16; 425/443; 425/444; 425/552; 425/556; 425/572; 425/574; 425/588; 425/592; 425/DIG. 5; 425/DIG. 51
[58] Field of Search ............. 249/110; 264/297.2, 264/328.1, 272.17, 297.8, 328.8, 328.9, 328.16, 328.11; 425/572, 588, 443, 444, 556, DIG. 5, DIG. 34, DIG. 51, DIG. 247, 451.5, 552, 574, 592

[56] References Cited

U.S. PATENT DOCUMENTS 2,288,899 7/1942 Gits .
2,578,492 12/1951 Simpkins et al. .
3,327,355 6/1967 Carlin .
3,533,594 10/1970 Segmuller .
3,764,248 10/1973 Hall .
3,951,375 4/1976 Lowell .
4,126,292 11/1978 Saeki et al. .

OTHER PUBLICATIONS

I. I. Rubin, "Injection Molding Theory and Practice" J. Wiley & Sons, 1972.
Glanville and Denton, "Injection Mould Design Fundamentals" Industrial Press, 1965.
Walker and Martin, "Injection Molding of Plastics" Plastic Instit. of London, pp. 98–99.
Plastics Mold Engineering Handbook, 3rd ed., J. H. DuBois and W. I. Pribble, Von Nostrand Reinhold Co. 1978, pp. 390–399.

Primary Examiner—James Lowe
Attorney, Agent, or Firm—E. W. Somers

[57] ABSTRACT

In order to mold a plurality of articles (20—20) which are disposed in a line, a molding arrangement in an apparatus (60) includes a plurality of cavities (109—109) which are spaced equidistantly from an infeed sprue (131). A primary network of a distribution system (50) through which an injection molding material is flowed from the infeed sprue to cavity gates (151—151) is disposed substantially along a vertical plane (150). Afterwards the injection molding material which has been flowed from the primary network and along a secondary network into the cavities is solidified. Then the primary network is exposed by causing wedge blocks (79—79) to be disengaged from each other and from an adjacent stationary platen (62) and cavity plate (90) by movement of each block in a direction transverse to the plane. This movement together with that between the cavity plate and the stationary platen and between the cavity plate and a core plate (102) in a direction parallel to the plane allows the solidified injection molding material in the distribution system and the articles to be removed from the apparatus after each molding cycle.

16 Claims, 10 Drawing Figures

Fig_1

Fig_4

Fig_7

Fig_3

Fig_2

Fig_8

METHODS OF AND APPARATUS FOR MOLDING ARTICLES THROUGH A BALANCED, REMOVABLE RUNNER SYSTEM

TECHNICAL FIELD

This invention relates to methods of and apparatus for molding articles. More particularly, it relates to methods of an apparatus for molding articles with a balanced, removable runner system which facilitates the distribution of an injection molding material to each of a plurality of mold cavities which are disposed along a longitudinal axis.

BACKGROUND

In the molding of plastic articles, it has long been an objective to cause flow paths or runner channels, as they are called, of a distribution system for injection molding material from an infeed channel to each of a plurality of injection gates and mold cavities to be substantially equal. Equal length flow paths from the infeed channel to the mold cavities enable the most uniform injection pressure to be achieved. Also, they result in a substantially uniform temperature condition of the injection molding material at the injection gates.

Control of the flow of molten polymeric injection molding material in a distribution system which is connected to each of a plurality of cavities also is important to achieve uniform filling of the cavities. Uniform filling is an important factor in the production of complete molded articles having consistent properties. If a mold cavity is not filled uniformly with polymeric material, the resultant molded article may be in a stressed condition and the article may warp to relieve the stresses. Also, the resultant molded article may be lacking in optical clarity.

Injection molding distribution systems which are capable of providing a uniform flow of molten polymeric material to a plurality of mold cavities are referred to as balanced runner systems. The term runner identifies the solidified injection molding material in a channel of the distribution system. A balanced runner system is one in which the runner channels of the distribution system from an infeed channel to the cavities are the same length and cross-section. Balanced runner systems are discussed by J. S. Walker and E. R. Martin in "Injection Molding of Plastics" 2nd Ed. The Plastics Institute, Iliffe Books, London, England, especially at pages 99 and 108-109. See also U.S. Pat. Nos. 3,533,594 and 3,951,375.

A typical prior art balanced runner system is shown in previously mentioned U.S. Pat. No. 3,533,594. The infeed channel is located at the center of a crossbar with mold cavitites being disposed at ends of the crossbar legs which are the runner channels. This simple pattern is termed a four cavity layout. Such a layout may be extended with crossbars being disposed at each end of the original crossbar. In another arrangement which is referred to as an "H" pattern, injection molding material is flowed from an infeed channel along a runner channel to each of two side runner channels and then bidirectionally along each side runner channel to the cavities. These arrangements require substantial space to accommodate the runner channels. Further, these patterns cannot be extended easily to include an increased number of mold cavities which are needed to mold simultaneously a substantial number of articles.

Some of these hereinbefore described prior art balanced arrangements are hot runner systems in which heating elements internal to the mold maintain the injection molding material in the distribution system in a molten condition. Hot runner systems involve substantially higher initial and maintenance costs than those for non-heated systems. Also, because the plastic material is in a molten condition in the distribution systems for a longer time before reaching the cavities, it may become degraded. In non-heated systems, the injection molding material in the distribution system from the infeed channel to the cavities is removed after each molding cycle. This is referred to as a removable runner system. For these systems, heating arrangements in the mold press are not required and the cavities can be closer together than in a hot runner system.

There are disadvantages associated with prior art balanced runner systems. The runners typically have been relatively large, generating more scrap or material to be reground for reuse and requiring larger molds. Larger molds in turn require larger presses with associated delivery barrels, resulting in greater residence time for the injection molding material. This could cause degradation of the injection molding material.

The disadvantages of balanced runner systems have discouraged their use in the past. It is little wonder that manufacturing engineers have opted for an unbalanced non-heated system comprising a simple two column layout of cavities with a main runner channel disposed between the columns of cavities and with transverse branches feeding the cavities. However, the trend toward the molding of substantial quantities of miniature articles having relatively thin walls has mandated another look at balanced runner systems. Desirably, the sought-after arrangement is a non-heated one which uses smaller molds and presses, faster cycles, and which results in less scrap and less degradation of the plastic material.

Clearly, to make the balanced runner approach more palatable to the industry, new techniques must be devised to overcome the hereinbefore discussed disadvantages. The prior art appears to be devoid of such solutions for non-heated balanced runner systems which are capable of providing a substantial number of articles in each cycle.

SUMMARY OF THE INVENTION

The foregoing problems have been overcome by the methods and apparatus of this invention. In a method of molding a plurality of articles through a balanced distribution system, an injection molding material is flowed into an infeed channel and distributed from the infeed channel through a runner channel system which is disposed along a plane to a plurality of locations which are spaced equidistantly from the infeed channel. The injection molding material is guided from the locations into each of a plurality of cavities having the contour of the articles and being spaced equidistantly from the locations, and caused to be solidified. Then the solidified injection molding material in the distribution system is caused to be separated from that in the cavities, and surfaces which define the cavities are separated from each other by causing relative movement in a direction parallel to the plane to facilitate removal of the articles from the cavities. Surfaces which define the runner channel system and which extend along the plane are separated by causing relative movement therebetween in a direction which is transverse to the plane to facilitate removal of the solidified injection molding material from the runner channel system.

In an injection molding apparatus of this invention, an injection molding material is fed from a supply into an infeed channel. Facilities including two adjacent surfaces are provided for defining a runner channel system along a parting plane for distributing an injection molding material from the infeed channel to a plurality of locations which are spaced equidistantly from the infeed channel. Channels also are provided for guiding the injection molding material from the locations into each of a plurality of cavities having the contour of the articles and being spaced equidistantly from the locations. Also provided are facilities for causing the injection molding material in the cavities to be separated from that in the channels after it has solidified and for separating surfaces which define the cavities by causing relative movement in a direction parallel to the plane. This facilitates removal of the articles from the cavities. The apparatus also includes facilities for separating surfaces which define the runner channel system and which extend along the plane by causing relative movement in a direction transversely of the plane.

It is within the scope of the invention to provide a plurality of cavities which are arranged in two columns disposed symmetrically about a centerline of a mold. In that arrangement, the distribution system includes a primary network extending from the infeed channel to a secondary network which includes runner channels transversely disposed of the parting plane. The runner channels of the secondary network include passageways which communicate with the cavities. The primary network is disposed along the parting plane.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

The methods and apparatus of this invention are used to mold a plurality of articles 20-20 (see FIG. 1) in a longitudinal disposed array 22. The articles 20-20 shown in FIG. 1 are exemplary only and many other articles may be molded by the methods and apparatus of this invention.

Figures 1, 4, 7:
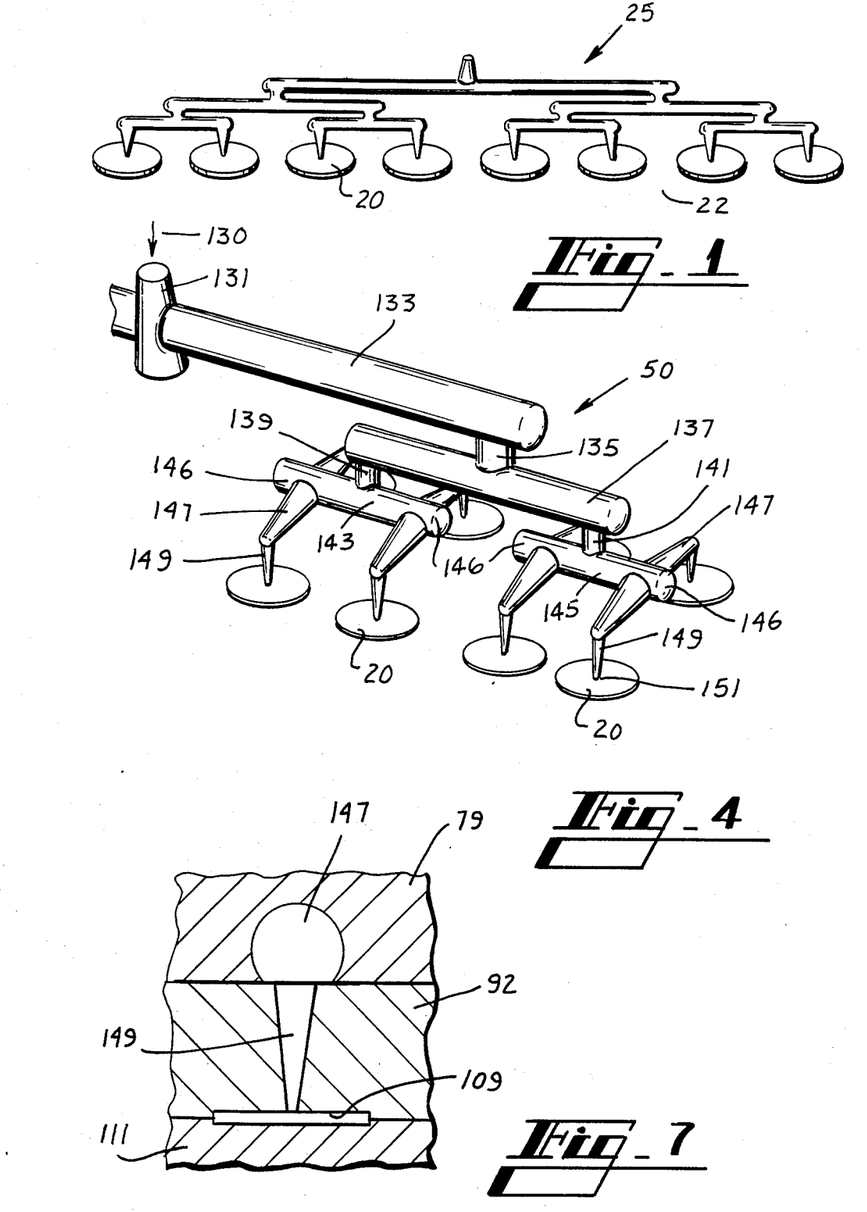
FIG. 1 is a perspective view of a plurality of articles, which are injection molded with the methods and apparatus of this invention, and of a distribution system which is used to distribute injection molding material to cavities to mold the articles.
FIG. 4 is a perspective view of a preferred embodiment of a distribution system of this invention.
FIG. 7 is a cross-sectional end view of a transverse runner channel of FIG. 4.

As also can be seen in FIG. 1, the articles are interconnected by a balanced distribution system 25 which is a departure from those of the prior art. The distribution system 25 is arranged to be disposed along a vertical plane which is defined between abutting surfaces of the mold and which is perpendicular to parting lines between plates of the mold.

The distribution system 25 comprises runner channels for the injection molding material from an infeed point to the cavities. The injection molding material in the distribution system is removed after each molding cycle. As will be recalled, the molded skelton which interconnects the articles is referred to as a runner system and if it is removed after each molding cycle from the distribtuion network of channels, it is referred to as a removable runner system. Further, if it is balanced, as herein, it is called a balanced, removable runner system.

Figure 2:
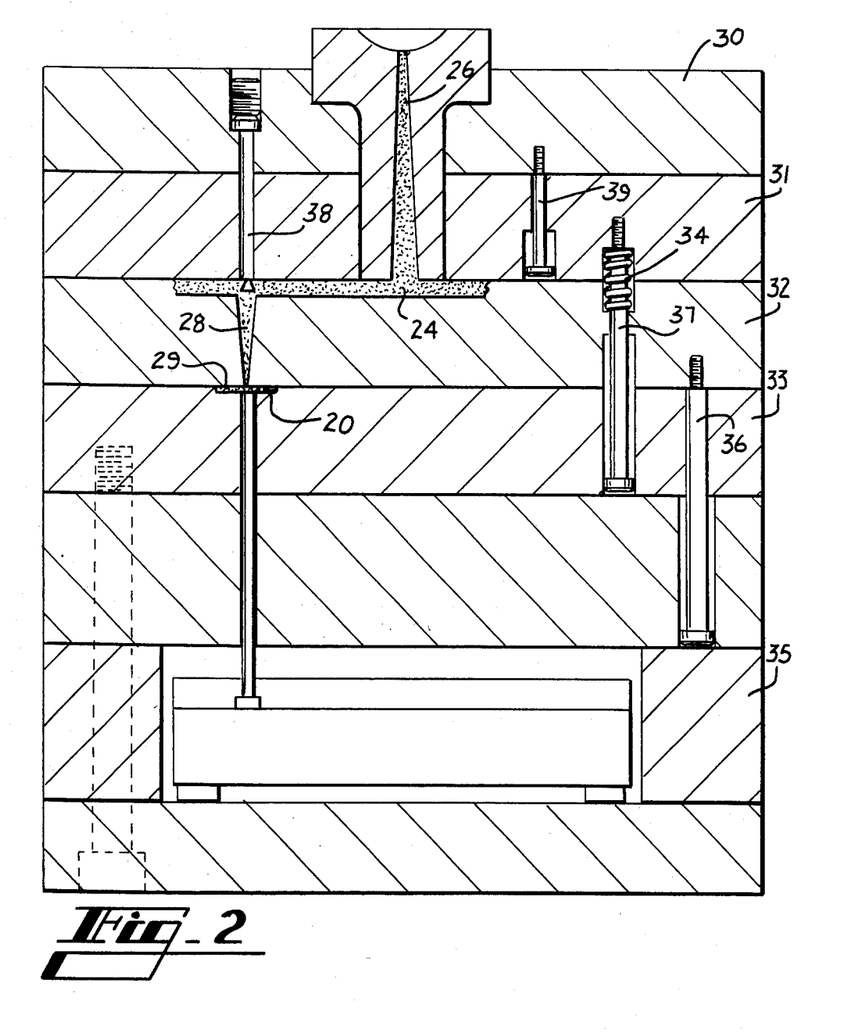
FIG. 2 is a plan view of a prior art injection molding apparatus.

A prior art design of a molding arrangement for a plurality of articles may be seen in FIG. 2. There, a main runner channel 24 extends from an infeed channel or sprue 26 to passageways or runners 28-28 at spaced intervals along the main runner channel. A plurality of gated cavities 29-29 are attached to the ends of these runner channels which also are called drops. The arrangement shown in FIG. 2 is a conventional three plate mold which includes a stationary sprue platen 30, a stripper plate 31, a cavity plate 32 and a core plate 33 and a movable platen 35. In addition to two plates, one attached to each of the stationary and moving platens, the three plate mold includes the third or cavity plate 32 which is referred to as a floating or center plate. The mold cavities 29-29 are disposed between the floating and the core plates. When the mold press opens, springs 34-34 cause the plate 32 to separate slightly from the plate 31, breaking the gates. Continued movement of the platen 35 causes the core plate to be moved along stripper bolts 36-36 therafter causing the cavity plate 32 to be moved along stripper bolts 37-37 and the stripper plate 31 from the plate 30 by movement of the stripper plate along stripper bolts 39-39. It should be understood that the mold includes a plurality of stripper bolts which are disposed in planes normal to the plane of the drawing. The runners are separated from the cavities 29-29 by runner pullers or sucker pins 38-38.

Figure 3:
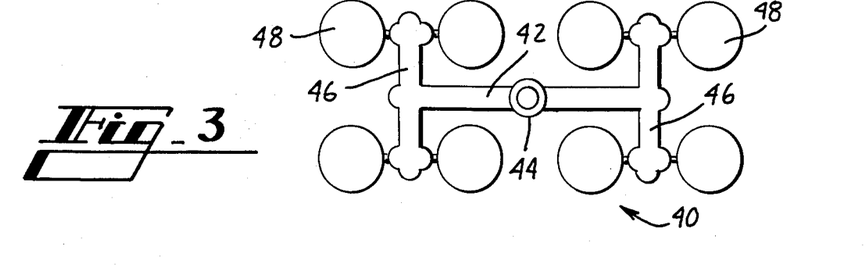
FIG. 3 is a plan view of a prior art arrangement of a balanced runner system.

The arrangement shown in FIG. 2 is not a balanced runner system. Distances from the infeed channel 26 to the cavities 29-29 vary. A typical balanced runner system 40 is shown in FIG. 3. There, a runner channel 42 extends from an infeed channel 44 with cross channels 46-46 at opposite ends of the runner channel. The cross channels 46-46 extend bidirectionally to gated cavities 48-48. Herein, the distance from the infeed channel 44 to each gated cavity 48 is substantially the same. However, the system in FIG. 3 has a limited ability to be extended and causes problems in the separation of the mold parts to remove the runners and the molded articles.

The distribution system shown in FIG. 1 provides a suitable balanced, removable runner system for a single line of articles 20-20. It may be extended, for example, to a distribution system 50 (see FIG. 4) which is the preferred embodiment of this invention and which is used to mold a plurality of articles 20-20 arranged in two columns.

Figure 5:
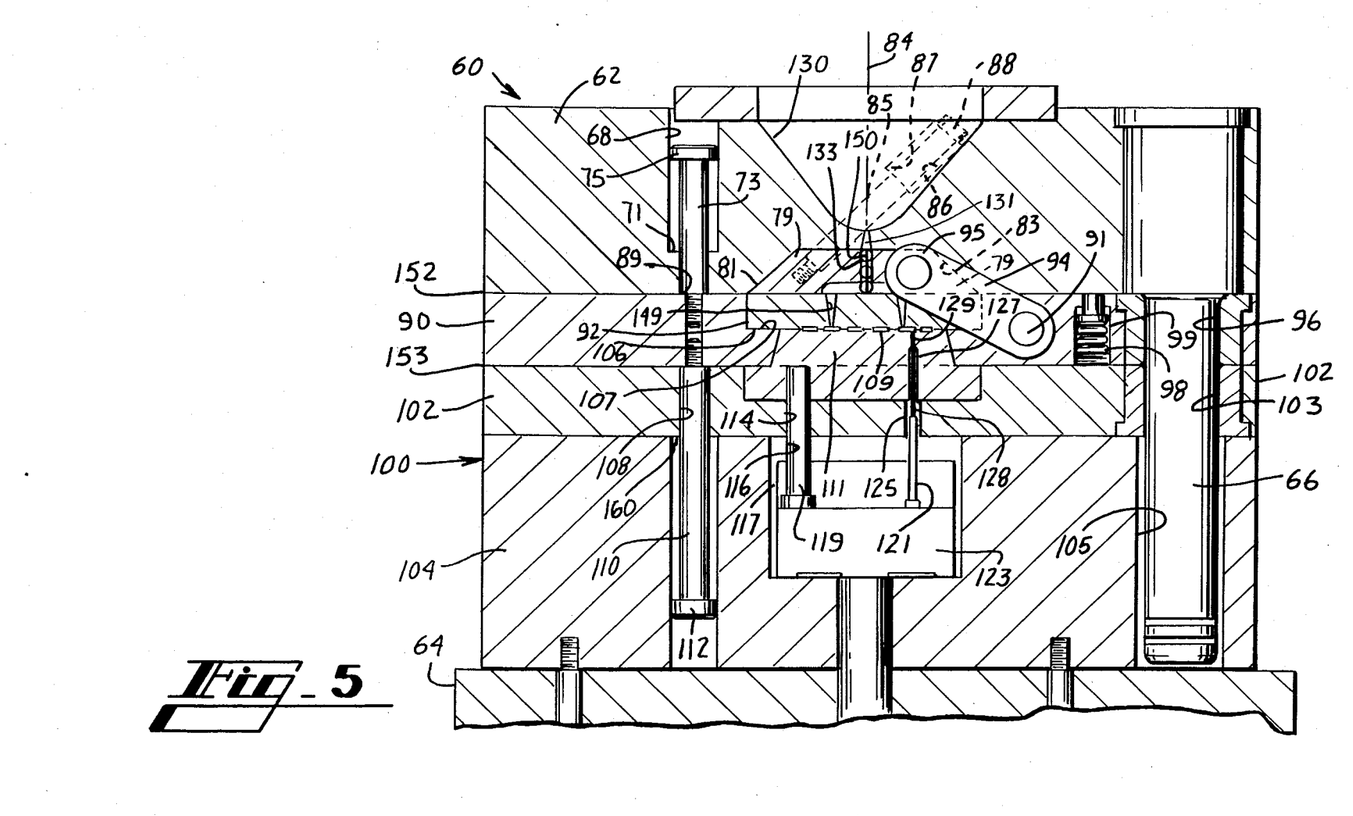
FIG. 5 is a plan view of a molding apparatus of this invention.

Referring now to FIG. 5, there is shown a plan view of an apparatus which is designated generally by the numeral 60 and which is used to provide the distribution system shown in FIG. 4. The apparatus 60 is used to mold a plurality of articles 20-20 which are disposed in two longitudinal columns and which are provided with injection molding material through the distribution system 50.

The apparatus 60 includes a stationary backup plate or platen 62 and a movable press 64. Extending from the stationary platen 62 are a plurality of leader pins 66-66, only one of which appears in FIG. 5. The stationary platen 62 further includes a chamber 67 (see FIG. 6) which has a trapezoidal configuration and which extends the length of the stationary platen. The stationary platen 62 also includes spaced bores 68-68 each having an annular ledge 71. Received within each bore 68 is a stripper bolt 73 having a head 75 that is adapted to engage the annular ledge 71.

Disposed within the chamber 67 are a pair of wedge blocks 79-79 having surfaces 81-81 adapted to ride along surfaces 83-83 of the chamber. The wedge blocks 79-79 are adapted to engage each other along a centerline 84 of the mold press where adjacent surfaces of the wedge blocks define a portion of the distribution system 50. Each wedge block 79 is attached to stripper bolts 85-85 each of which is disposed slidably within a stepped bore 86 having an annular ledge 87. Each stripper bolt 85 has a headed end 88 which upon movement of the associated wedge block is destined to engage a ledge 87. The stripper bolts 85-85 are designed to guide the movement of the wedge blocks 79-79.

As can be seen in FIG. 5, an outer end 89 of the stripper bolt 73 is threadably secured to a plate 90 which is referred to as a cavity plate. The cavity plate 90 is that plate of a molding arrangement which is closest to the distribution network 50. The cavity plate 90 also extends the length of the stationary platen 62 and includes an insert 92 which is adapted to be disposed adjacent to the chamber 67 in the stationary platen. Surfaces of the insert 92 and the wedge blocks 79-79 cooperate to define portions of the distribution system 50.

Pivotally connected to the cavity plate 90 at a pin 91 on each side of the centerline 84 is a connecting link 94. For purposes of clarity, only one line 94 is shown in the drawings. Each link 94 has an opposite end 95 pin-connected to one of the wedge blocks 79-79. The cavity plate 90 also includes bores 96-96 through which the leader pins extend and a spring-loaded plunger 98 which is disposed in a stepped bore 99.

The cavity plate 90 is interposed between the stationary platen 62 and a movable unit 100 that is connected to the press 64. The unit 100 comprises a plate 102 which includes openings 103-103 through which the leader pins extend and a movablel platen 104 having bores 105-105 through which the same pins extend. The movable platen 104 is capable of being moved in a direction along the axis 84 of the mold by the press 64. The plate 102 commonly is referred to as a core plate and is defined as that plate through which ejector pins extend. Depending on the shape to be molded, the core and the cavity plates could be interchanged insofar as names are concerned. A surface 106 of the insert 92 and a surface 107 of an extension 111 of the core plate cooperate to define cavities 109-109 in which the articles 20-20 are molded. The cavities 109-109 communicate with runner channels of the distribution network 50.

The core plate 102 includes a plurality of bores 108-108 through each of which a stripper bolt 110 extends. Each stripper bolt 110 is attached to the cavity plate 90 and at its other end includes a head 112. It should be noted that the core plate 102 and the movable platen 104 are moved together as a unit relative to the cavity plate 90. As the mold press 64 opens, the unit 100 is moved away from the stationary platen 62 and from the cavity plate 90. Also disposed within a bore 114 in the core plate and a bore 116 and an opening 117 in the movable platen 104 are a plurality of return pins 119-119. The return pins 119-119 are used to return a plurality of ejector pins 121-121 to a molding position to allow the mold cavities 109-109 to fill. As is seen in FIG. 5, the ejector pins 121-121 are attached to a block 123 disposed within the opening 117 and extend into bores 125-125 in the core plate 102 and bores 127-127 in the extension 111 of the core plate. Smaller diameter portions 128-128 of the ejector pins 121-121 extend into smaller diameter bores 129-129 which communicate with the mold cavities 109-109.

The apparatus 60 also includes facilities which are not shown but which are conventional in the art for controlling that temperature of and for causing the injeciton molding material in the distribution system 50 and in the cavities to be solidified in each cycle of injection. See U.S. Pat. No. 3,497,173, for example, which shows such facilities and which is incorporated by reference hereinto. See also pages 212–213 of a text entitled "Plastic Molding Technique" authored by D. A. Dearle and published in 1970 by the Channel Publishing Company of New York.

Assuming now that the plurality of articles 20-20 shown in FIG. 4 are to be molded, the operation of the apparatus 60 begins with the molding press 64 being in a closed position as shown in FIG. 5. Molten plastic material is flowed through a nozzle pocket 130 into an infeed channel of sprue 131 (see FIGS. 4 and 5), and along runner channels of the distribution system 50. The injection molding material is flowed along a divisional runner 133 through a channel or drop 135 and along a divisional runner channel 137. The divisional runner channel 137 directs the plastic material to runner channels 139 and 141 from which the plastic material is directed along divisional runner channels 143 and 145 to locations 146-146. For the arrangement shown in FIG. 4, the distribution system from the infeed channel 131 to the locations 146-146 comprises what is referred to as a primary network and is disposed along a parting plane 150 (see FIG. 5) which is coincident with the axis 84 and between the wedge blocks 79-79.

From the divisional runner channels 143 and 145 and the locations 146-146, the plastic material is flowed transversely of the distribution plane 150 along a secondary network comprising a plurality of flow passages in the form of runner channels 147-147 and runner channels or passageways 149-149 to gates 151-151. The plastic material is flowed through the gates 151-151 into the mold cavities 109-109 (see also FIG. 5). It should be observed that the distribution occurs mainly in the plane 150 which is coincident with the parting line of the wedge blocks 79-79 but perpendicular to parting lines of the mold apparatus between the plates. A parting line 152 of the mold apparatus 60 is disposed between the stationary platen 62 and the cavity plate 90, whereas a parting line 153 lies between the cavity plate 90 and the core plate 102. Branching and balancing of the distribution system is accomplished in the plane 150.

Figure 6:
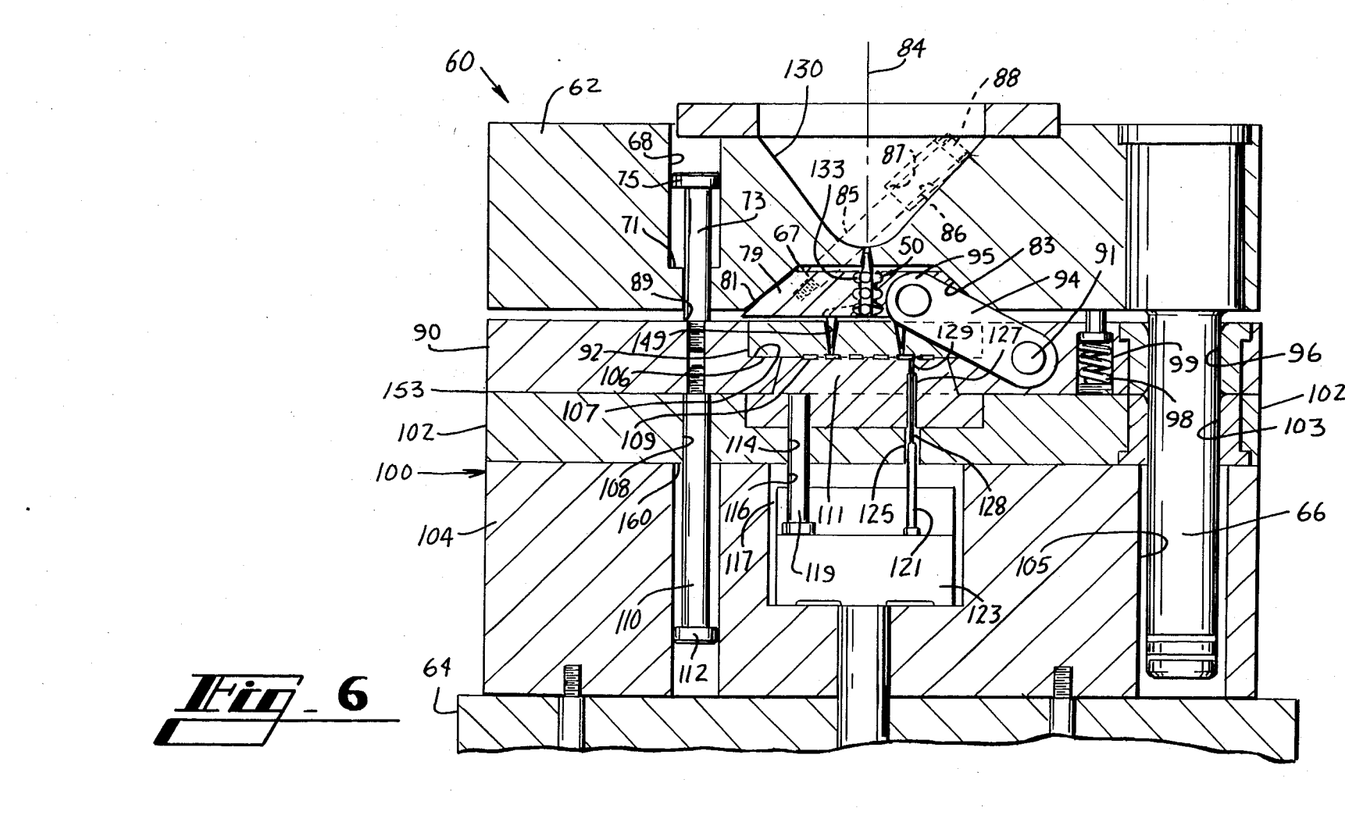
FIG. 6 is a plan view of the apparatus of FIG. 5 at a stage subsequent to the introduction of molding material into the cavities thereof.

After the injection molding material has solidified, the mold press 64 is controlled to be opened in a direction parallel to the plane 150 whereupon the unit 100 is caused to be moved downwardly as viewed in FIG. 6. It should be understood that in the apparatus, the parting line of the primary runner network lies in the vertical plane 150 and that FIGS. 5, 6, 8 and 10 represent plan views of the apparatus 60.

As the unit 100 is moved along the leader pins 66-66, the springs 98-98 are rendered effective to urge the cavity plate 90 out of engagement with the stationary platen 62 (see FIG. 6). The movement of the cavity plate 90 breaks the engagement of the wedge blocks 79-79 with each other along the plane 150. This also causes relative movement between the insert 92 which is part of the cavity plate 90 and the wedge blocks 79-79. As can be seen in FIG. 7, a cross-section of the runner channels 147-147 in the wedge blocks 79-79 is greater than semi-circular. As a result, when the break between the wedge blocks 79-79 and the insert 92 occurs, the solidified molding material in the runner channels 149-149 remains attached to that in the runner channels 147-147 which are retained by the wedge blocks 79-79. This avoids the use of runner pullers such as those designated 38-38 in FIG. 2. Runner pullers impede the flow of the injection molding material and impair the uniform distribution of same to the cavities. In effect, this movement separates the solidified injection molding material in the runner channels 149-149 (see FIG. 6) from that of the molded articles in the mold cavities 109-109. As can be appreciated from the drawings, this separation and subsequent movement of the unit 100 exposes the mold cavities 109-109 and allows the molded articles 20-20 now separated from the associated sprue gates to descend into a receptacle (not shown) when the press is opened further.

The core plate 102 is stationary relative to the movable platen 104 at all times in this arrangement. The two move together as the mold press 64 opens with the unit 100 being moved along the stripper bolts 110-110. Also of interest is the movement of the wedge blocks 79-79. Their movement is guided by the stripper bolts 85-85 and the extent of their travel limited by the engagement of their headed ends 88-88 with the ledges 87-87.

Initially, when the cavity plate 90 is separated from engagement with the stationary platen 62 by the action of the springs 98-98, the link pins 94-94 are moved relative to the stationary platen. This causes the links 94-94 to apply forces to the wedge blocks 79-79 to cause the blocks to be separated slightly and to become disengaged from a surface 155 which defines the trapezoidal chamber 67 (see FIGS. 8 and 9). The links 94-94 and the wedge blocks 79-79 are arranged so that as they are moved, the distance $d_1$ which a surface 159 of the cavity plate 90 becomes spaced from the stationary platen 62 is equal to the sum of the separation $d_2$ of a surface 157 from the surface 155 and of a distance $d_3$ from a surface 158 to the surface 159 of the cavity plate 90 (see FIGS. 8 and 9).

Figure 8:
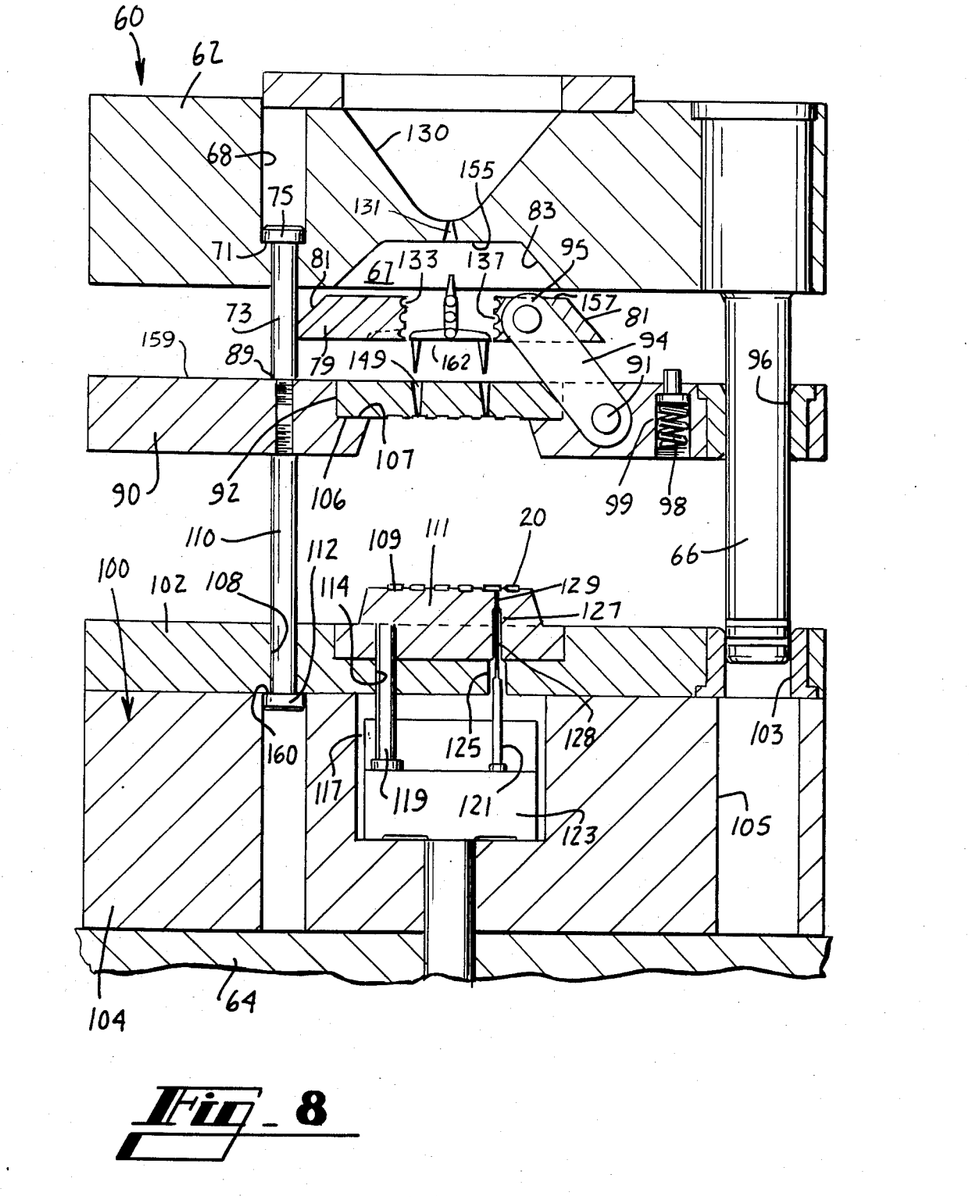
FIG. 8 is a plan view of the apparatus of FIG. 5 after plates thereof have been separated along parting lines of the mold.
Figure 9:
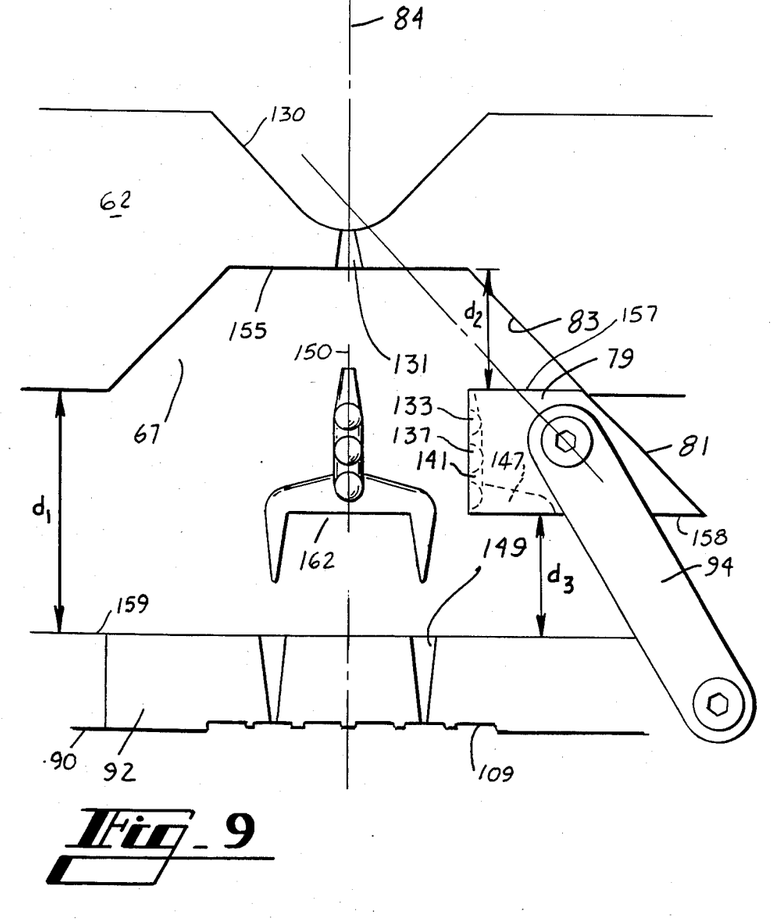
FIG. 9 is a plan view of a portion of the apparatus of FIG. 5 after surfaces thereof which define a primary network of the distribution system have been separated.

As the mold press 64 opens further, the heads 112-112 of the stripper bolts 110-110 are moved along the bores 108-108 until the headed ends bottom out against a portion 160 of the core plate 102 (see FIG. 8). Continued movement of the mold press and the unit 100 causes the cavity plate 90 which is secured to the stripper bolts 110-110 to be moved from the stationary platen 62 and to cause the stripper bolts 73-73 to be pulled along within the bores 68-68 until the stripper bolts 73-73 bottom out in engagement with the ledges 71-71.

When the stripper bolts 110-110 cause the cavity plate 90 to be pulled along toward the movable platen 104, the wedge blocks 79-79 are caused to be moved further. As can best be seen in FIG. 9, each wedge block 79 moves in two coordinate directions simultaneously. Moreover, the movement is such that each block 79 is spaced equidistantly from the surface 155 of the stationary platen and from the surface 159 of the cavity plate. When the plate 90 is caused to be moved farther from the stationary platen 62, the solidified injection molding material in the passageways 149-149 becomes separated from the insert 92 and the wedge blocks 79-79 are moved from the stationary platen 62 (see FIG. 8). As each wedge block 79 moves from the parting plane 150, the solidified molding material in the distribution system which comprises the primary and secondary networks which extend from the infeed channel 131 to the cavities 109-109 becomes exposed. The solidified molding material, which is disposed in the distribution system 50 and which is referred to as a runner system 162 has the configuration of the distribution system. Inasmuch as the runner system 162 already has been separated from the articles 20-20, it is free to fall into a receptacle (not shown).

The removal of the runner system upon movement of the wedge blocks 79-79 without the aid of pullers such as those shown in FIG. 2 is advantageous. A further advantage is found in at least the primary network of the distribution system being disposed along a plane, i.e. the plane 150, which is not coincident with the parting lines between the mold plates. The plane 150 is normal to the parting lines 152 and 153 between the plates which define the cavities 109-109 for example. This allows the removal of the molded runner framework 162 after each cycle or shot, as it is referred to, notwithstanding the molding of a substantial plurality of articles in each cycle.

Figure 10:
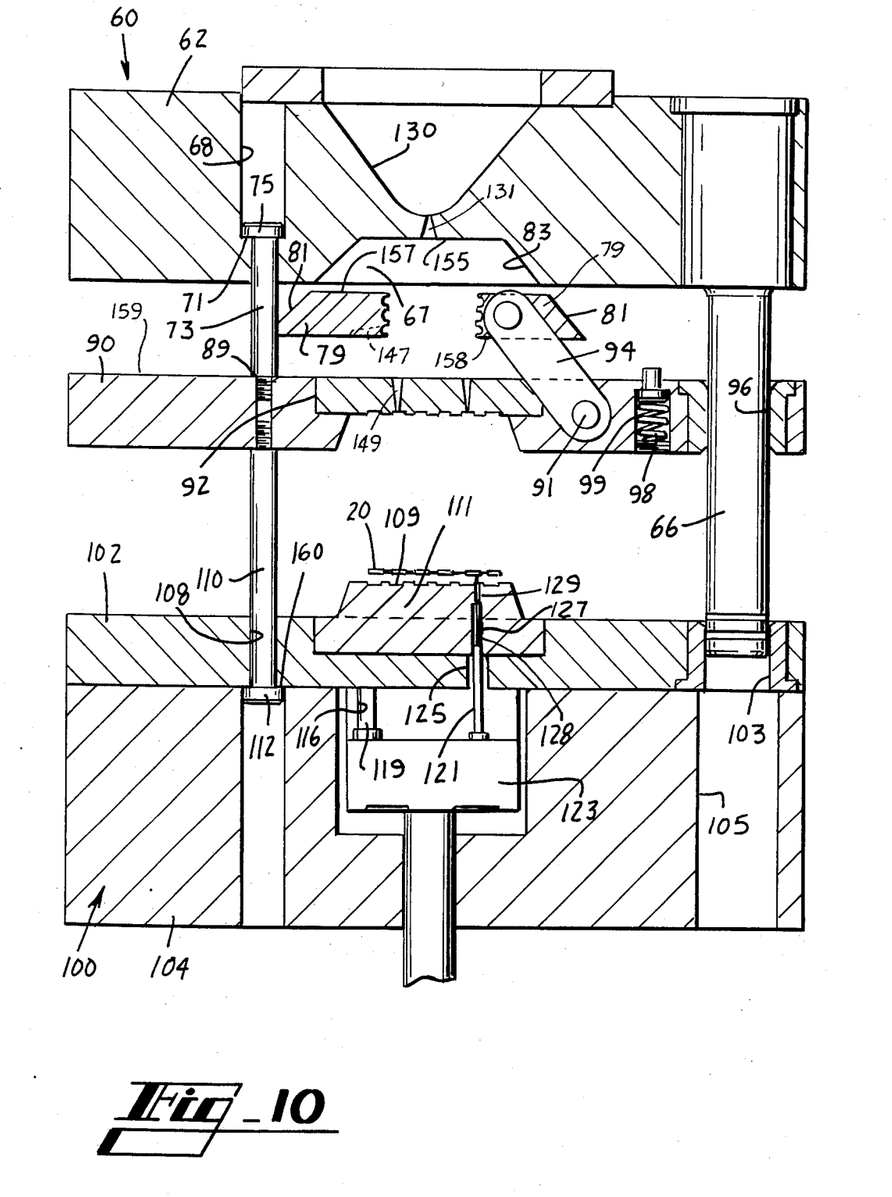
FIG. 10 is a plan view of the apparatus of FIG. 5 as the molded articles are being ejected.

In this cycle of molding, a final step is to eject the molded articles 20-20 from the cavities 109-109. The movement of the core plate 102 from the cavity plate 90 exposes the cavities 109-109 (see FIGS. 8 and 10) to permit the articles, now separated from the solidified molding material in the passageways 149-149 to be ejected therefrom. As is seen in FIG. 10, the block 123 is moved to extend the ejector pins 121-121 and cause the portions 128-128 thereof to remove the molded articles from the cavities 109-109.

It should be apparent that to mold a single line of articles 20-20, the passageways 149-149 would extend from the locations 146-146 at ends of the runners 143 and 145 to the cavities 109-109. In that event, the entire distribution system comprising the primary network and the secondary network, which would include only the passageways 149-149, is disposed along the parting plane 150. The cross-sectional configuration of the runner channels which communicate with drops to the cavities causes the solidified molding material in the drops to remain attached to the remainder of the distribution system to separate from the molded articles upon movement of the press. In the embodiment in FIG. 5, the primary network is disposed along the parting plane 150, unlike the secondary network which there comprises the transverse runners 147-147 and the passageways 149-149.

It is to be understood that the above-described arrangements are simply illustrative of the invention. Other arrangements may be devised by those skilled in the art which will embody the principles of the invention and fall within the spirit and scope thereof.

What is claimed is:

1. A method of molding a plurality of articles through a balanced distribution system, said method including the steps of:

flowing an injection molding material into an infeed channel;

distributing the injection molding material from the infeed channel through a runner channel system which is disposed along a plane to a plurality of locations which are spaced equidistantly from the infeed channel;

guiding the injection molding material from the locations into each of a plurality of cavities having the contour of the articles to be molded and being spaced equidistantly from the locations;

causing the injection molding material to solidify;

causing the solidified injection molding material in the distribution system to be separated from that in the cavities;

separating surfaces which define the cavities by causing relative movement between the surfaces in a direction parallel to the plane to facilitate removal of the articles from the cavities; and separating surfaces which define the runner channel system by causing relative movement therebetween in a direction which is transverse to the plane to facilitate removal of the solidified injection molding material in the runner channel system.

2. A method of molding a plurality of articles through a balanced distribution system, said method including the steps of:

flowing an injection molding material into an infeed channel;

distributing the injection molding material from the infeed channel through a primary runner channel system which is disposed along a single vertical plane to a plurality of locations which are spaced equidistantly from the infeed channel;

guiding the injection molding material from the locations through a secondary runner channel system into each of a plurality of cavities having a contour of the articles to be molded and being spaced equidistantly from the locations;

causing the injection molding material to solidify;

causing the solidified injection molding material in the secondary runner channel system to be separated from that in the cavities;

separating surfaces which define the cavities by causing relative movement between the surfaces in a direction parallel to the plane to facilitate removal of the articles from the cavities; and separating surfaces which define at least the primary runner channel system by causing relative movement therebetween in a direction transverse to the plane, and moving surfaces which define at least a portion of the secondary runner channel system in a direction parallel to the plane to facilitate removal of the solidified injection molding material from the runner channel systems.

3. The method of claim 2, wherein a portion of the secondary runner channel system is disposed transversely of the plane.

4. The method of claim 3, wherein the surfaces which define at least the primary runner channel system also define a portion of the secondary runner channel system which is disposed transversely of the plane.

5. The method of claim 2, wherein the primary and secondary runner channel systems are disposed along the plane.

6. The method of claim 2, wherein said step of causing the solidified injection molding material in the secondary runner channel system to be separated from that in the cavities is accomplished by causing relative movement between blocks, which include the surfaces that define at least the primary runner channel system and those surfaces that define at least a portion of the secondary runner channel system, in a direction parallel to the plane and by causing at least portions of runner channels which communicate with the cavities to have a cross-sectional configuration which causes their retention by the blocks when relative movement occurs between the blocks and the surfaces which define at least a portion of the secondary runner channel system.

7. An apparatus for molding a plurality of articles disposed at least in one longitudinal array with a balanced, removable runner system, said apparatus comprising:

supply means including an infeed channel for feeding an injection molding material;

means including adjacent surfaces which extend along a plane and which define a runner channel system for distributing an injection molding material from the infeed channel to a plurality of locations which are spaced equidistantly from the infeed channel;

channel means for guiding the injection molding material from the locations into each of a plurality of cavities having the contour of the articles to be molded and being spaced equidistantly from the infeed channel;

means for causing the injection molding material to be solidified;

means for causing the solidified injection molding material in said channel means to be separated from that in the cavities;

means for separating surfaces which define the cavities by causing relative movement therebetween in a direction parallel to the plane to facilitate removal of the articles from the cavities; and means for separating surfaces which define the runner channel system by causing relative movement therebetween in a direction transversely of the plane to facilitate removal of the solidified injection molding material in the runner channel system.

8. An apparatus for molding a plurality of articles disposed at least in one longitudinal array with a balanced, removable runner system, said apparatus comprising:

supply means including an infeed channel for feeding an injection molding material;

means including adjacent surfaces which extend along a plane and which define a primary runner channel system for distributing an injection molding material from the infeed channel to a plurality of locations which are spaced equidistantly from the infeed channel;

plate means having adjacent surfaces therebetween for defining a plurality of cavities each having the contour of one of the articles to be molded and being spaced equidistantly from the infeed channel, said vertical plane being normal to said adjacent surfaces of said plate means;

a secondary runner channel system for guiding the injection molding material from the locations into each of the plurality of cavities;

means for causing the injection molding material in said runner channel systems and in the cavities to be solidified;

means for causing the solidified injection molding material in the secondary runner channel system to be separated from that in the cavities;

means for separating surfaces which define the cavities by causing relative movement between surfaces which define the cavities in a direction parallel to the plane to facilitate removal of the articles from the cavities; and means for separating surfaces which define at least the primary runner channel system by moving them in directions transverse to the plane, and means for moving surfaces which define at least a portion of the secondary system in a direction parallel to the plane to expose the solidified injection molding material in the runner systems and facilitate its removal.

9. An injection molding apparatus for molding a plurality of articles with a balanced, removable runner system, said apparatus comprising:

supply means for feeding an injection molding material;

a stationary platen which includes a chamber defined partially by camming surfaces and an infeed channel for receiving injection molding material from the supply means;

a moveable unit which includes:
 a supporting platen which is adapted to be moved subsequent to the inflow of injection molding material; and
 a first plate adapted to be moved with said supporting platen;

a second plate which is disposed between said first plate and said stationary platen and which is adapted to be moved relative to said first plate and to said stationary platen, said first and second plates cooperating to provide a plurality of cavities therebetween for receiving injection molding material from which the articles are molded;

block means disposed within said chamber adjacent to said second plate and separable along a vertical parting plane in directions transverse of said parting plane for defining a distribution system to guide injection molding material from the infeed channel to the cavities, said distribution system including runner channels and having at least a substantial portion disposed along said parting plane and being arranged to cause the cavities to be spaced equidistantly from the infeed channel, said parting plane being normal to surfaces of said first and second plates and of said stationary platen which engage each other during feeding of the injection molding material and which are adapted to become spaced apart subsequent thereto;

means for causing the injection molding material in the distribution system and in the cavities to be solidified;

means disposed within said second plate and adjacent to said stationary platen and responsive to movement of said movable unit for causing said second plate to become spaced from said stationary platen and said block means to separate the solidified injection molding material in the distribution system from that in the cavities; and means for causing portions of said block means to become spaced apart and from said second plate and for causing said second plate to become spaced from said first plate to allow the solidified injection molding material in the distribution system and in the cavities to be removed from said apparatus.

10. The injection molding apparatus of claim 9, wherein said block means includes:
two blocks which are disposed within said chamber of said stationary platen and which have surfaces that cooperate to provide a primary runner channel system from the infeed channel to a secondary runner channel system which communicates with the cavities such that the distances from the infeed channel to said cavities are substantially equal, said blocks being adapted to be disengaged from said stationary platen and said second plate after injection molding material has been flowed into the cavities between said first and second plates and solidified.

11. The apparatus of claim 10, wherein means are provided to cause said blocks to be moved such that each of said blocks moves along a camming surface of said chamber to cause each said block to be moved in two coordinate directions with respect to said plane thereby causing said blocks to be moved apart from each other and spaced equidistantly from said stationary platen and from said second plate.

12. The apparatus of claim 10, which also includes means for causing said moveable unit to be moved relative to said second plate and said stationary platen to separate the surfaces which define the cavities at the interface between said first and second plates.

13. The apparatus of claim 10, which also includes a plurality of ejector pins which are adapted to be extended through said first plate into the cavities to eject the molded articles.

14. The apparatus of claim 10, wherein said secondary runner channel system includes runner channels in said blocks which extend in a direction normal to the plane from said primary runner channel system between said blocks and into runner channels in said second plate which extend in a direction parallel to the plane to said cavities.

15. The apparatus of claim 14, wherein said runner channels of said secondary runner channel system which extend normal to the plane have a cross-sectional configuration which facilitates retention of the solidified injection molding material therein when said second plate becomes spaced from said blocks to cause solidified injection molding material in the runner channels in said second plate to be separated from that in the cavities and upon further separation between said blocks and said second plate to cause it to be withdrawn from the second plate.

16. The apparatus of claim 15, wherein said apparatus also includes a link which is pin-connected to each block and to said second plate so that as said second plate is moved toward said movable unit, the links cause forces to be applied to said blocks to cause said blocks to be moved along the camming surfaces to expose the solidified injection molding material in the distribution system.

* * * * *